(12) United States Patent
Lee et al.

(10) Patent No.: US 10,569,666 B1
(45) Date of Patent: Feb. 25, 2020

(54) VEHICLE AND METHOD FOR CONTROLLING THE SAME

(71) Applicants: Hyundai Motor Company, Seoul (KR); Kia Motors Corporation, Seoul (KR)

(72) Inventors: Chung Hi Lee, Seoul (KR); HyeonSoo Kim, Gyeonggi-do (KR); TaeSun Roh, Seoul (KR); DonHyoung Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/274,507

(22) Filed: Feb. 13, 2019

(30) Foreign Application Priority Data

Oct. 15, 2018 (KR) .................. 10-2018-0122299

(51) Int. Cl.

| | |
|---|---|
| *B60L 53/65* | (2019.01) |
| *H04L 29/06* | (2006.01) |
| *B60L 53/30* | (2019.01) |
| *B60L 53/66* | (2019.01) |
| *B60L 53/16* | (2019.01) |
| *B60L 53/60* | (2019.01) |
| *B60L 53/68* | (2019.01) |

(Continued)

(52) U.S. Cl.
CPC .............. *B60L 53/65* (2019.02); *B60L 53/00* (2019.02); *B60L 53/126* (2019.02); *B60L 53/16* (2019.02); *B60L 53/305* (2019.02); *B60L 53/60* (2019.02); *B60L 53/66* (2019.02); *B60L 53/665* (2019.02); *B60L 53/68* (2019.02); *H04L 63/0823* (2013.01); *B60L 2240/80* (2013.01)

(58) Field of Classification Search
CPC ...... B60L 53/00; B60L 53/126; B60L 53/305; B60L 53/60; B60L 53/65; B60L 53/66; B60L 53/665; B60L 53/68
See application file for complete search history.

(56) References Cited

U.S. PATENT DOCUMENTS

| | | | | |
|---|---|---|---|---|
| 2012/0161702 | A1* | 6/2012 | Kim | ........................ B60L 58/13 |
| | | | | 320/109 |
| 2012/0249069 | A1* | 10/2012 | Ohtomo | .................... B60L 1/08 |
| | | | | 320/109 |

(Continued)

FOREIGN PATENT DOCUMENTS

| | | |
|---|---|---|
| JP | 2014060477 A | 4/2014 |
| KR | 10-2013-0006949 A | 1/2013 |
| KR | 10-2017-0090008 A | 8/2017 |

*Primary Examiner* — Andrew W Bee
(74) *Attorney, Agent, or Firm* — Mintz Levin Cohn Ferris Glovsky and Popeo, P.C.; Peter F. Corless

(57) ABSTRACT

A vehicle is provided to obtain reliable time information via communication with a server without separate hardware. The vehicle includes a communicator that is configured to receive authentication information from a server and a charging port that is electrically connected to a charger. The charging port is configured to receive time information of the charger from the charger. A controller is then configured to derive time information of the vehicle based on the time information of the charger and reference time information included in the authentication information and adjust the time of at least one processor disposed within the vehicle to be synchronized.

14 Claims, 8 Drawing Sheets

(51) Int. Cl.
 *B60L 53/126* (2019.01)
 *B60L 53/00* (2019.01)

(56) References Cited

U.S. PATENT DOCUMENTS

| | | | |
|---|---|---|---|
| 2013/0127416 A1* | 5/2013 | Karner | G06Q 20/102 |
| | | | 320/109 |
| 2016/0149692 A1 | 5/2016 | Kim et al. | |
| 2016/0297313 A1* | 10/2016 | Ono | B60L 11/1838 |
| 2017/0034867 A1 | 2/2017 | Oshida | |
| 2017/0255224 A1* | 9/2017 | Bowden | G06F 1/12 |

* cited by examiner

VEHICLE AND METHOD FOR CONTROLLING THE SAME

CROSS-REFERENCE TO RELATED APPLICATION(S)

This application is based on and claims priority under 35 U.S.C. § 119 to Korean Patent Application No. 10-2018-0122299, filed on Oct. 15, 2018, the disclosure of which is incorporated by reference in its entirety.

BACKGROUND

1. Field of the Disclosure

The present disclosure relates to a vehicle, and more particularly, to a method for determining time information of the vehicle, and a method for controlling the vehicle.

2. Description of the Related Art

An electric vehicle is an apparatus that obtains driving energy of the vehicle from electrical energy, not from the combustion of fossil fuels like existing automobiles. The main energy source of the electric vehicle is a battery, and the weight reduction, reduction in size and reduction in charging time of the battery are essential for the practical use of the electric vehicle. Electric vehicles are being widely developed, and the electrical energy required for driving may be secured by performing high-speed/low-speed charging periodically in the electric vehicle.

Electrical energy is increasingly being applied as a fee-based service for improving the merchantability. To use the service, it is necessary to check the validity period of certificates, contracts, etc. and perform procedures such as updating, renewing, and discarding information. However, to determine reference time information of the electric vehicle, separate hardware is required and it may be difficult to view the time information determined by the separate hardware as unflawed information.

SUMMARY

Therefore, it is an aspect of the present disclosure to provide a vehicle capable of obtaining reliable time information via communication with a server without separate hardware, and a method for controlling the same. Additional aspects of the disclosure will be set forth in part in the description which follows and, in part, will be obvious from the description, or may be learned by practice of the disclosure.

In accordance with an aspect of the present disclosure, a vehicle may include: a communicator configured to receive authentication information from a server; a charging port electrically connected to a charger, configured to receive time information of the charger from the charger; and a controller configured to derive time information of the vehicle based on the time information of the charger and reference time information included in the authentication information and adjust the time of at least one processor included within the vehicle to be synchronized.

The controller may be configured to change the time information of the charger based on the reference time information and use the changed time information of the charger as the time information of the vehicle. The controller may further be configured to change the time information of the charger when the difference between the reference time information and the time information of the charger is less than a predetermined time and use the time information of the changed charger as the time information of the vehicle. Additionally, the controller may be configured to release the connection with the charger when the difference between the reference time information and the time information of the charger exceeds a predetermined time.

The vehicle may further include a storage. The controller may further be configured execute control of at least one of invalidation or renewal of a certificate when the time information of the vehicle passes a validity period of the certificate stored in the storage. Additionally, the controller may be configured to execute control of at least one of invalidation or renewal of a contract when a validity period of the contract stored in the storage passes the time information of the vehicle. The controller may then be configured to communicate with the server based on a request signal received from the charger to receive the authentication information.

In accordance with another aspect of the present disclosure, a method for controlling a vehicle may include: receiving authentication information from a server; electrically connecting to a charger, and receiving time information of the charger from the charger; deriving time information of the vehicle based on the time information of the charger and reference time information included in the authentication information; and adjusting the time of at least one processor included in the vehicle to be synchronized.

The deriving of time information of the vehicle may include changing the time information of the charger based on the reference time information and using the time information of the changed charger as the time information of the vehicle. Additionally, the deriving of time information of the vehicle may include changing the time information of the charger when the difference between the reference time information and the time information of the charger is less than a predetermined time and using the time information of the changed charger as the time information of the vehicle.

The method may further include: releasing the connection with the charger when the difference between the reference time information and the time information of the charger exceeds a predetermined time. The method may further include: executing control of at least one of invalidation or renewal of a certificate when the time information of the vehicle passes a validity period of the certificate stored in a storage. The method may further include: executing control of at least one of invalidation or renewal of a contract when a validity period of the contract stored in the storage passes the time information of the vehicle. The deriving of time information of the vehicle may include communicating with the server based on a request signal received from the charger to receive the authentication information.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
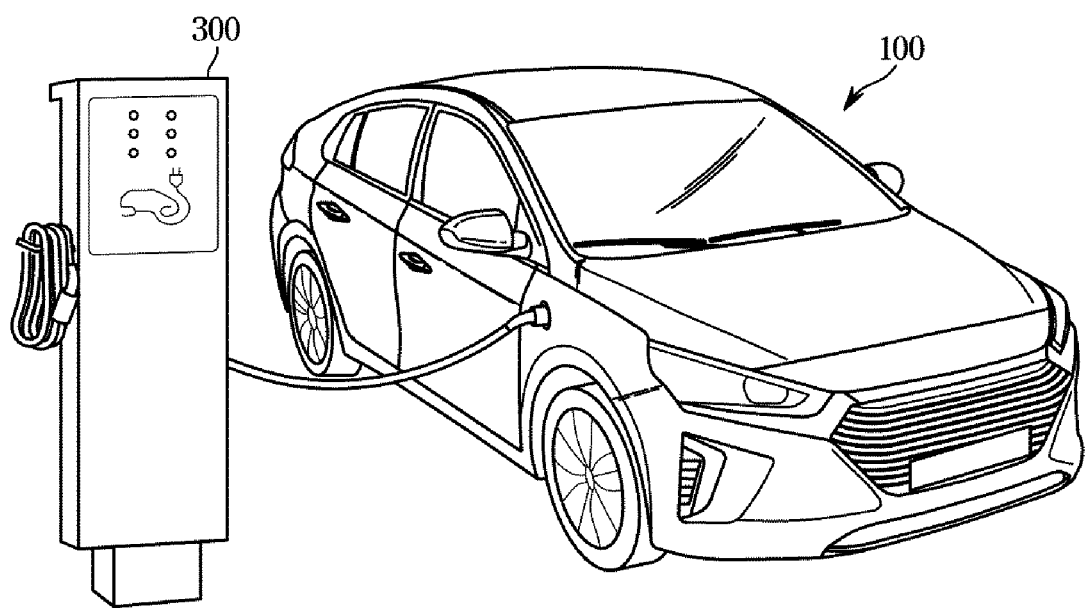
FIG. 1 is a view illustrating the appearance of a vehicle and a charger according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of the exemplary embodiments of the present disclosure will be described, and the description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network. It will be further understood that the term "member" and its derivatives refer both to when a member is in contact with another member and when another member exists between the two members. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are merely used for convenience of explanation, but not to limit an order of the steps. Thus, unless the context clearly dictates otherwise, the written order may be practiced otherwise. Hereinafter, an operation principle and the exemplary embodiments of the present disclosure will be described with reference to the accompanying drawings.

FIG. 1 is a view illustrating the appearance of a vehicle and a charger according to an exemplary embodiment. A vehicle 100 may include a driving device. In particular, the driving device of the vehicle 100 may include a motor that generates rotational force by receiving power from a battery. The driving source of the vehicle 100 may be electrical energy stored by the battery. The battery may be configured to receive electricity from the outside of the vehicle 100, that is, from a charger 300. The charger 300 may be connected by a charging port provided in a vehicle body to charge the battery. The vehicle 100 according to an exemplary embodiment of the present disclosure may be an electric vehicle such as the electric vehicle (EV), a hybrid electric vehicle (HEV), or a fuel cell electric vehicle (FCEV). The vehicle 100 may prepare for driving by connecting the battery to the charger 300 before driving.

Meanwhile, the battery serving as the driving power source of the vehicle 100 may be rapidly charged by directly connecting direct current (DC) power (e.g., high-speed charging facility) to the battery or may be charged at a constant rate by connecting alternating current (AC) power to the vehicle 100. The charger 300 may be configured to convert the AC power into DC power and supply the AC power to the vehicle 100 in the high-speed charging facility used as the DC power in a high-speed charging method. In particular, since the charger 300 is directly connected to the battery in the vehicle 100 and provides a high current, charging of the battery of the vehicle 100 may be completed in a short period of time.

On the other hand, when the AC power is supplied to the vehicle 100 using commercial AC power connected to a power distribution system in a slow-speed charging method, the charger 300 may be configured to convert the AC power into DC power in the vehicle 100 to charge the battery. When applying the slow-speed charging method, the on board charger (OBC) having the circuit configuration of the power conversion system may be mounted within the vehicle 100 since the AC voltage supplied from the commercial AC power must be converted into DC voltage.

Figure 2:
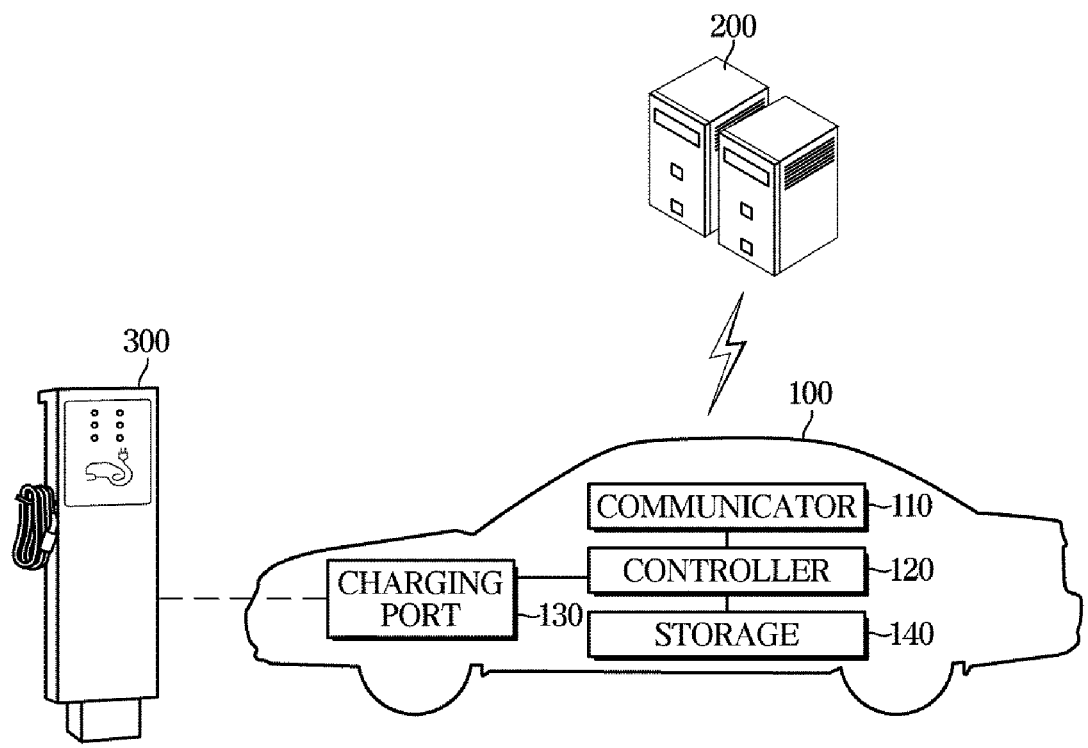
FIG. 2 is a control block diagram of the vehicle according to an exemplary embodiment.

FIG. 2 is a control block diagram of the vehicle according to an exemplary embodiment. The vehicle 100 according to an exemplary embodiment may include a communicator 110 configured to communicate with a server 200, a controller 120, and a charging port 130 connected to the charger 300. The communicator 110 may be configured to receive authentication information from the server 200. The communicator 110 may additionally be configured to receive information via transport layer security (TLS) communication with the server 200.

Particularly, the transport layer security communication may be a technology that provides security at a network layer, which may authenticate a user with certificates on the Internet and provide confidentiality and integrity to the user. The information received by the communicator 110 may include an online certificate status protocol (OCSP). The OCSP may refer to a protocol that allows the user to validate certificates in real time by determining the revocation and suspension status to solve the update cycle problem of a digital signature certificate revocation list.

The communicator 110 may include one or more components that enable communication with an external device, for example, at least one of a short-range communication module, a wired communication module, and a wireless communication module. The short-range communication module may include various short range communication modules configured to transmit and receive signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wireless communication module may include a wireless fidelity (WiFi) module, a wireless broadband (Wibro) module, and/or any wireless communication module for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless communication module may include a wireless communication interface having an antenna and a transmitter configured to transmit authentication information. The wireless communication module may further include a signal conversion module configured to modulate a digital control signal output from the controller 120 via a wireless communication interface according to the operation of the controller 120 into an analog type wireless signal. The wireless communication module may include a wireless communication interface having an antenna and a receiver configured to receive the authentication information. The wireless communication module may further include a signal conversion module configured to demodulate the analog type wireless signal received through the wireless communication interface into the digital control signal.

The charging port 130 may be electrically connected to the charger 300 and may receive time information from the charger 300. The charger 300 and the vehicle 100 may communicate with each other via power line communication (PLC) through the charging port 130. The PLC may be a communication method of transmitting and receiving signals using electricity supplied through power lines. The PLC may be capable of ultrahigh-speed communication by transmitting signals at 60 Hz and other frequency bands, that is, 1 to 30 MHz frequency bands. The charger 300 may be configured to receive time information of the charger 300 determined by the charger 300 as a reference based on the PLC described above from the charger 300.

A storage 140 may be configured to store a certificate or the like required for the vehicle 100. The certificate stored by the storage 140 may include a certificate required for validating and updating a smart key or an encryption key authentication validity period, and a certificate required for validation and updating of a contract validity period related to payment through a provider. The storage 140 may be implemented with at least one of a non-volatile memory device, such as cache, read only memory (ROM), programmable ROM (PROM), erasable programmable ROM (EPROM), or electrically erasable programmable ROM (EEPROM), a volatile memory device, such as random access memory (RAM), or a storage medium, such as hard disk drive (HDD) or compact disk (CD-ROM), without being limited thereto. The storage 140 may be a memory implemented with a chip separate from the aforementioned processor in relation to the controller 120, or may be implemented integrally with the processor in a single chip.

The controller 120 may be configured to derive the time information of the vehicle 100 based on the time information of the charger 300 and reference time information included in the authentication information received from the server 200 and adjust the time of at least one processor included within the vehicle 100 to be synchronized. The authentication information received from the server 200 may include an identification (ID) for the server 200, an electronic signature value, and a response message generation time. The controller 120 may then be configured to obtain the reference time information of the vehicle 100 by comparing the time information included in the authentication information transmitted by the server 200 with the time information of the charger 300.

Additionally, the controller 120 may be configured to change the time information of the charger 300 received from the charger 300 based on the reference time information, and use the time information as the time information of the vehicle 100. In particular, when the difference between the reference time information and the time information of the charger 300 is less than a predetermined time, the controller 120 may be configured to change the time information of the charger 300 and use the information as the time information of the vehicle 100.

An exemplary predetermined time may be determined based on the time for verificating a certificate.

According to an exemplary embodiment, the predetermined time may be determined to be one second.

When the difference between the reference time information and the time information of the charger 300 exceeds the predetermined time, the controller 120 may be configured to release the connection with the charger 300. In other words, the controller 120 may be configured to determine that the time information of the charger 300 exceeds the usable time information when the time information of the charger 300 differs from the reference information by more than the predetermined time, disconnect the charger 300 and attempt to connect the charger 300 again. In the above-described manner, the controller 120 may be configured to determine the reference time of the vehicle 100 and perform at least one of invalidation or renewal of a certificate when the time information of the vehicle 100 passes the validity period of the certificate stored in the storage 140.

When a contract is stored in the storage 140 of the vehicle 100, similar to the certificate, the controller 120 may be configured to perform at least one of invalidation or renewal of a contract when the validity period of the contract passes the time information of the vehicle 100. Meanwhile, the above-described operations may be performed by communicating with the server 200 based on a request signal received from the charger 300 and receiving the authentication information. In particular, the controller 120 may be requested for authentication through the charger 300.

The controller 120 may be configured to perform an authentication check procedure and process the authentication information received from the server 200 as time information and use the authentication information as the reference time information in the vehicle 100. In addition, the authentication information may be transmitted through a digital signature and may be utilized as non-repudiation and authorized time information.

The vehicle 100 may also be configured to synchronize the determined reference time information to the processor provided within the vehicle 100. The processor provided within the vehicle 100 may refer to a processor that is disposed within the vehicle 100 and uses the time information, which will be described later. The controller 120 may be implemented with a memory (not shown) configured to store an algorithm to execute the operation of the components within the vehicle 100 or data regarding a program that implements the algorithm, and a processor (not shown) configured to execute the aforementioned operation using the data stored in the memory. The memory and the processor may be implemented in separate chips. Alternatively, the memory and the processor may be implemented in a single chip.

Meanwhile, the vehicle 100 may include an audio video navigation (AVN) apparatus (not shown) and a real-time clock (not shown), and a detailed description related thereto will be described later. At least one component may be added or deleted corresponding to the performance of the components of a system/apparatus illustrated in FIG. 2. It will be readily understood by those skilled in the art that the mutual position of the components may be changed corresponding to the performance or structure of the vehicle 100.

Figure 3:
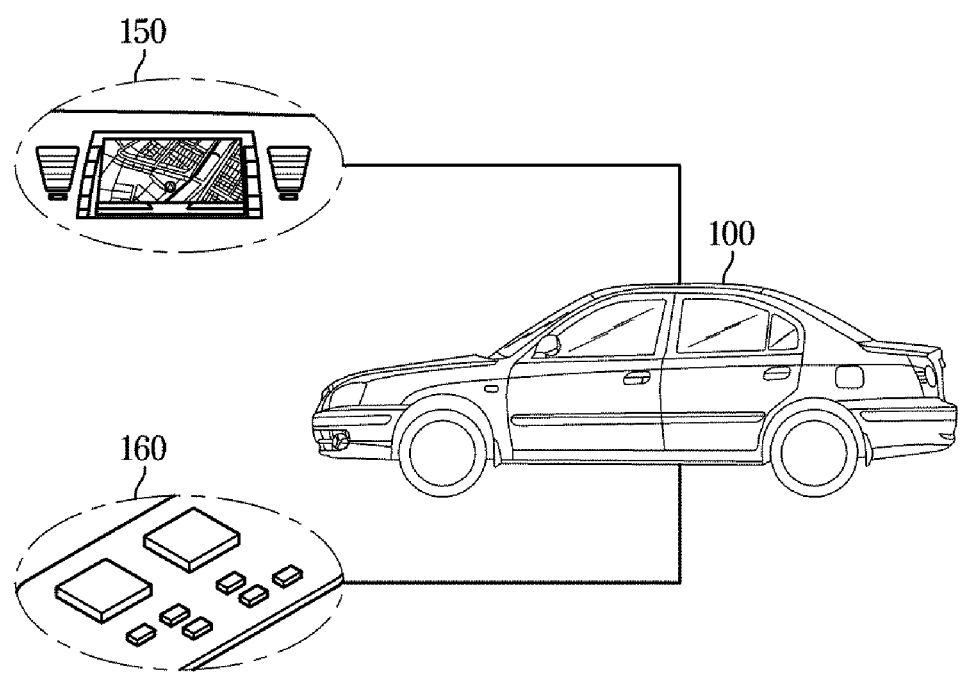
FIGS. 3 and 4 are views illustrating an operation of determining time information of the vehicle according to an exemplary embodiment.
Figure 4:
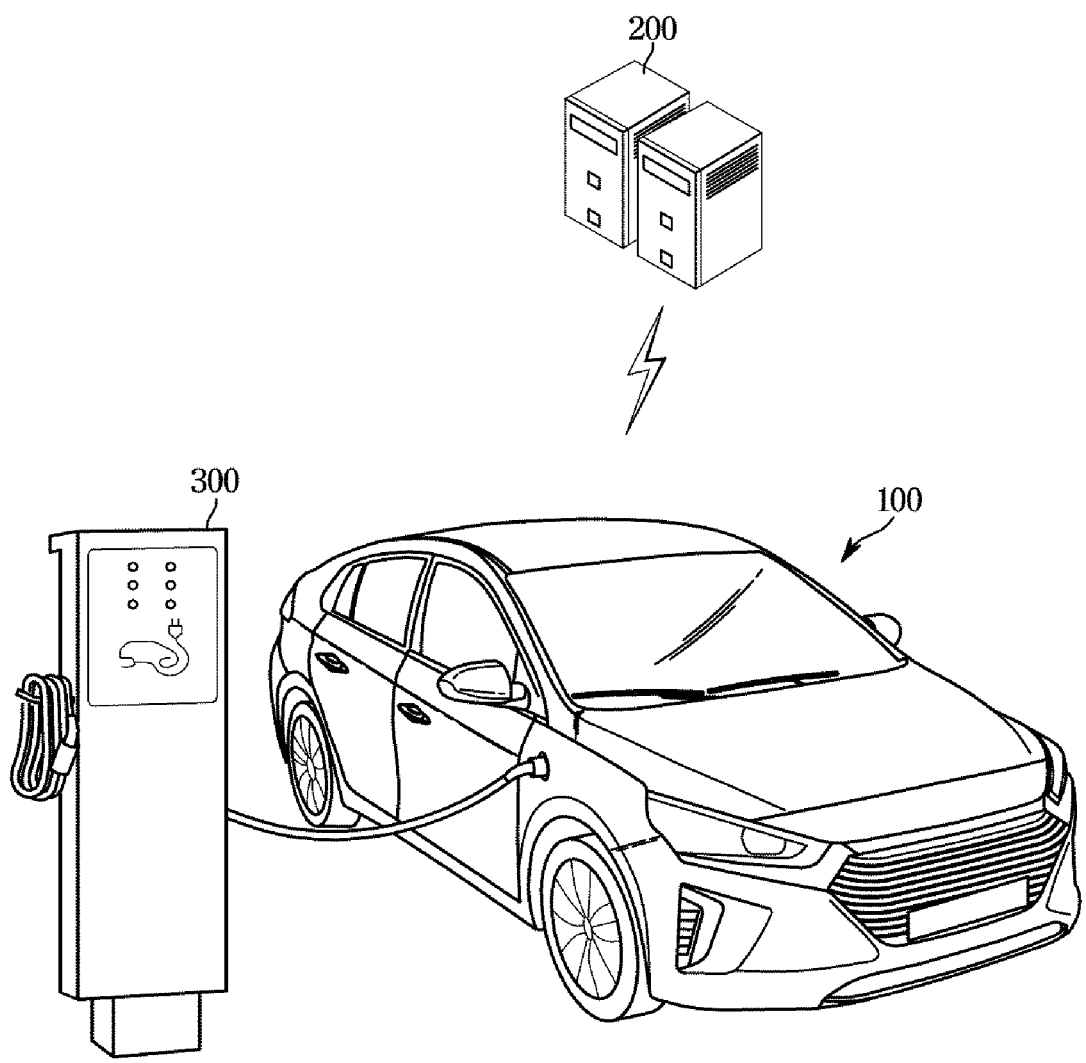

Furthermore, each of the components shown in FIG. 2 may be referred to as a hardware component such as software and/or a field programmable gate array (FPGA) and an application specific integrated circuit (ASIC). FIGS. 3 and 4 are views illustrating an operation of determining time information of the vehicle according to an exemplary embodiment. Referring to FIG. 3, an operation for obtaining the reference time information through an AVN apparatus 150 and a real-time clock 160 is described. The AVN apparatus 150 may be configured to receive the time information via communication with the outside.

Particularly, the vehicle 100 may be configured to determine the reference time information of the vehicle 100 based on the AVN apparatus 150. Even when the AVN apparatus 150 is not provided, the reference time information may be determined based on the real-time clock 160 disposed within the vehicle 100. However, the present disclosure does not necessarily include the AVN device or the real-time clock 160, and the operation described with reference to FIG. 3 is merely an example of determining the reference time information of the vehicle 100.

Referring to FIG. 4, the vehicle 100 may be configured to communicate with the charger 300 and the server 200 as described above. In particular, the vehicle 100 may be configured to communicate via the PLC through the charging port 130 and communicate wirelessly with the server 200 through the communicator 110. In electrically charging the vehicle 100 using the charger 300, the vehicle 100 may be configured to transmit and receive various information to and from the charger 300 in addition to transmitting electric power. According to the exemplary embodiment, the vehicle 100 may be configured to receive the request signal from the charger 300. The request signal may include the vehicle 100 receiving authentication information from the server 200. In addition, the vehicle 100 may be configured to receive the time information of the charger 300 from the charger 300.

On the other hand, the vehicle 100 may be configured to receive the authentication information from the server 200 based on the request signal of the charger 300, and extract the reference time information from the authentication information. As described above, the authentication information may include information in addition to the reference time information.

Furthermore, the controller 120 of the vehicle 100 may be configured to compare the reference time information and the time information of the charger 300 with the reference time information included in the authentication information with high reliability. The controller 120 of the vehicle 100 may then be configured to determine the reliability of the time information of the charger 300 through a comparison of the reference time information and the time information of the charger 300 and perform verification of the time modulation of the charger 300. In particular, the controller 120 may be configured to compare the time information of the charger 300 with the reference time information. When the time information of the charger 300 and the reference time information match, the controller 120 may be configured to validate each of the time information and determine each of the time information of the vehicle 100 as the time information of the vehicle 100.

When the difference between the reference time information and the time information of the charger 300 is less than the predetermined time, the controller 120 may be configured to change the time information of the charger 300 and use the reference time information as the time information of the vehicle 100 by unifying the time information. The predetermined time may be determined as the time for verification of the authentication information.

Meanwhile, when the difference between the reference time information and the time information of the charger 300 exceeds a predetermined time, the vehicle 100 may be configured to release the communication connection with the charger 300 since the time information of the charger 300 is difficult to be relied upon and the charger 300 is time-modulated or the like so that time synchronization between the charger 300 and the vehicle 100 is difficult. The vehicle 100 may try to reconnect after disconnecting from the charger 300. When the reference time information of the vehicle 100 is determined based on the above-described operation, the certificate or the contract stored in the vehicle 100 may be invalidated or renewed based on the determined time information.

Figure 5:
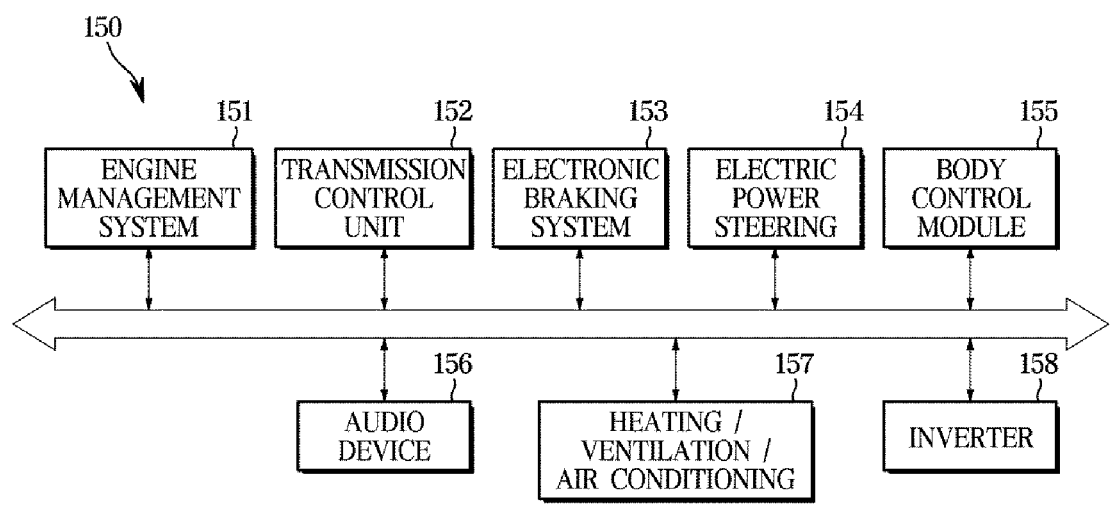
FIG. 5 is a view illustrating an operation of synchronizing time of at least one processor provided in the vehicle according to an exemplary embodiment.

FIG. 5 is a view illustrating an operation of synchronizing time of at least one processor disposed within the vehicle according to an exemplary embodiment. The vehicle 100 may be configured to determine the reference time information based on the above-described method and synchronize the time information of the processor based on the determined reference time information.

FIG. 5 illustrates a component including at least one processor according to the exemplary embodiment. The controller 120 may be configured to synchronize the time of component parts as described below based on the time information of the determined vehicle 100. As illustrated in FIG. 5, the vehicle 100 may include an engine management system (EMS) 151, a transmission control unit (TCU) 152, an electronic braking system (EBS) 153, an electric power steering (EPS) 154, a body control module (BCM) 155, an audio device 156, a heating/ventilation/air conditioning (HVAC) 157, an inverter 158, a sensor and a power distributor.

The engine management system 151 may be configured to execute the operation of an engine and manage the engine in response to an acceleration command through an accelerator pedal. For example, the engine management system 151 may be configured to perform engine torque control, fuel consumption control, engine failure diagnosis, and the like. The transmission controller 152 may be configured to execute the operation of a transmission in response to a driver's shift command through a shift lever or a driving speed of the vehicle 100. For example, the transmission controller 152 may be configured to perform shift control, clutch control, engine torque control during shifting, and the like.

Additionally, the electronic braking system 153 may be configured to operate a braking device of the vehicle 100 and maintain the balance of the vehicle 100 in response to a braking command through a brake pedal. For example, the electronic braking system 153 may include an anti-lock brake system (ABS) and an electric stability control (ESC). The electric power steering 154 may assist the driver to operate the steering wheel more easily. For example, the electric power steering 154 may assist the driver in steering operations such as reducing the steering force during low-speed driving or parking and increasing the steering force during high-speed driving.

The vehicle body control module 155 may be configured to execute the operation of electrical components that provide convenience to the driver or ensure the safety of the driver. For example, the vehicle body control module 155 may be configured to operate a door lock, a head lamp, a wiper, a power seat, a seat heater, a cluster, a room lamp, navigation, and a multifunctional switch installed within the vehicle 100. In addition, the vehicle 100 may further include electrical components to protect the driver and provide comfort to the driver. For example, the vehicle 100 may include component parts 150 such as the door lock, the head lamp, the wiper, the power seat, the seat heater, the cluster, the room lamp, the navigation, the multifunctional switch, and the like.

The component parts 150 may be configured to communicate with each other via communication network NT for the vehicle 100 and synchronize the time through the network. For example, the component parts 150 may be configured to exchange data via an Ethernet, a Media Oriented Systems Transport (MOST), a Flexray, a Controller Area Network (CAN), a Local Interconnect Network (LIN), and the like. Meanwhile, it should be noted that the configurations illustrated in FIG. 5 are merely examples of the component parts 150, and may be an example of the configuration in which the vehicle 100 operates based on time.

Figure 6:
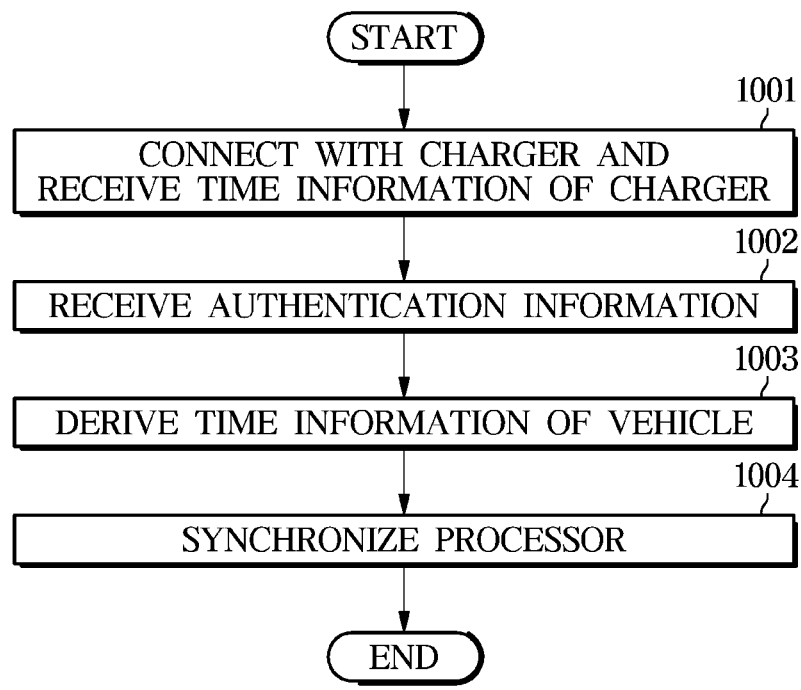
FIGS. 6 to 8 are flowcharts according to an exemplary embodiment.
Figure 7:
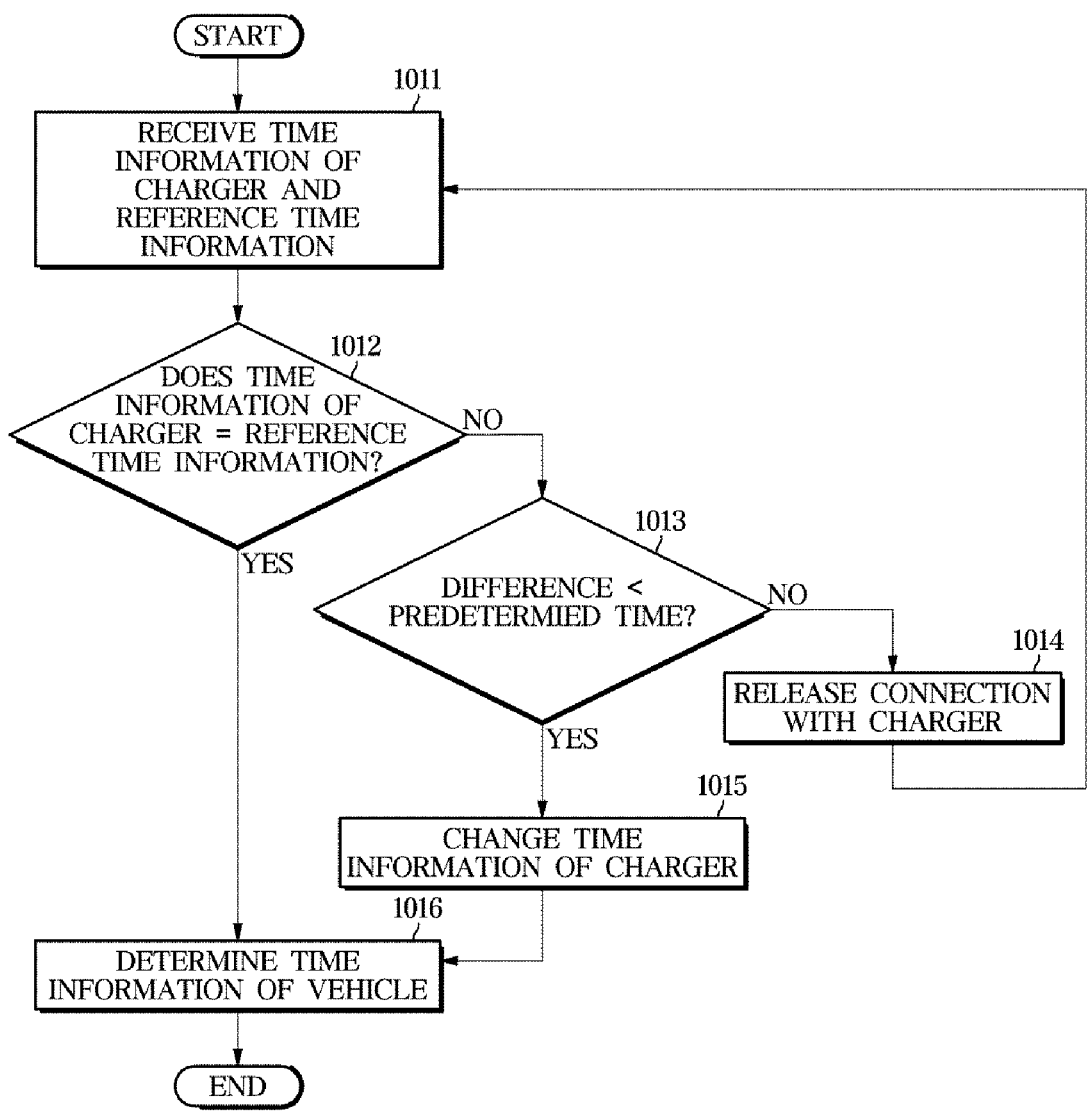
Figure 8:
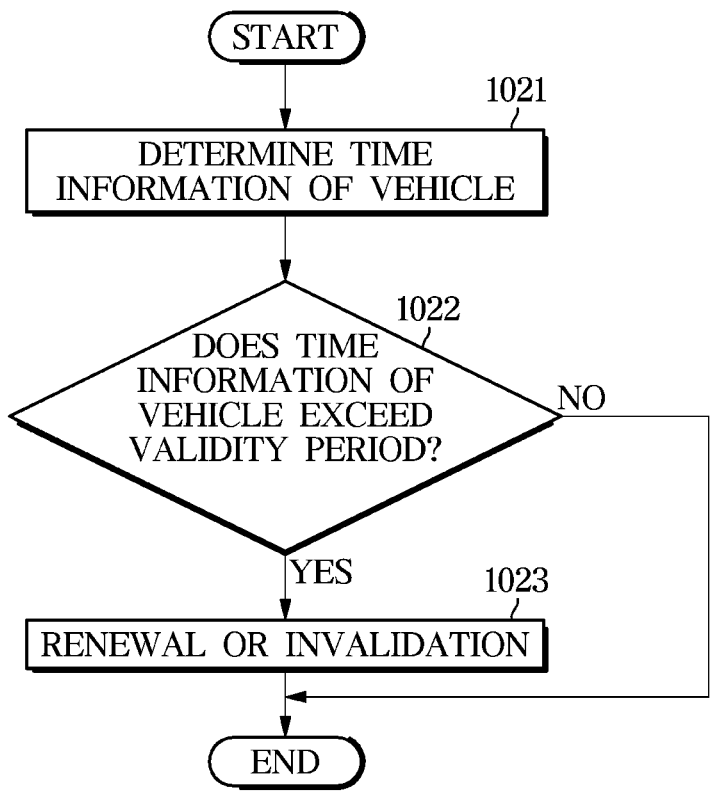

FIGS. 6 to 8 are flowcharts according to an exemplary embodiment. Referring to FIG. 6, the vehicle 100 may connect with the charger 300 and receive the time information of the charger 300 (1001). The vehicle 100 may further be configured to receive the authentication information from the server 200 based on the request signal of the charger 300 (1002). The vehicle 100 may then be configured to derive the time information of the vehicle 100 based on the time information of the charger 300 and the reference time information included in the authentication information (1003). The vehicle 100 may be configured to synchronize the processor disposed within the vehicle 100 based on the time information of the determined vehicle 100 (1004).

Referring to FIG. 7, the vehicle 100 may be configured to receive the time information of the charger 300 and the reference time information (1011). The controller 120 may then be configured to compare the time information of the charger 300 with the received reference time information (1012). When the time information of the charger 300 and the reference time information are less than the predetermined time, the time information of the charger 300 may be changed (1015) to determine the time information of the vehicle 100 (1016). When the time information of the charger 300 and the reference time information exceed the predetermined reference time information, the controller 120 may be configured to release the connection of the charger 300 (1014).

Referring to FIG. 8, whether the time information of the vehicle 100 has passed the validity period of the contract or certificate stored in the vehicle 100 may be determined after the time information of the vehicle 100 is determined (1021, 1022). When the time information of the vehicle 100 exceeds the validity period, the vehicle 100 may renew or invalidate the certificate or contract (1023).

As is apparent from the above description, the exemplary embodiments of the present disclosure may obtain reliable time information via communication with the server without separate hardware. Meanwhile, the exemplary embodiments of the present disclosure may be implemented in the form of recording media for storing instructions to be carried out by a computer. The instructions may be stored in the form of program codes, and when executed by a processor, may generate program modules to perform an operation in the embodiments of the present disclosure. The recording media may correspond to non-transitory computer-readable recording media. The non-transitory computer-readable recording medium includes any type of recording medium having data stored thereon that may be thereafter read by a computer. For example, it may be a Read Only Memory (ROM), a Random Access Memory (RAM), a magnetic tape, a magnetic disk, a flash memory, an optical data storage device, and the like.

The exemplary embodiments of the present disclosure have thus far been described with reference to accompanying drawings. It will be obvious to those of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:
1. A vehicle, comprising:
   a communicator configured to receive authentication information from a server;
   a charging port electrically connected to a charger, configured to receive time information of the charger from the charger; and
   a controller configured to derive time information of the vehicle based on the time information of the charger and reference time information included in authentication information and adjust the time of at least one processor indisposed within the vehicle to be synchronized.

2. The vehicle according to claim 1, wherein the controller is configured to adjust the time information of the charger based on the reference time information and use the changed time information of the charger as the time information of the vehicle.

3. The vehicle according to claim 1, wherein the controller is configured to adjust the time information of the charger when the difference between the reference time information and the time information of the charger is less than a predetermined time and use the time information of the changed charger as the time information of the vehicle.

4. The vehicle according to claim 1, wherein the controller is configured to release the connection with the charger when the difference between the reference time information and the time information of the charger exceeds a predetermined time.

5. The vehicle according to claim 1, further comprising:
a storage,
wherein the controller is configured to execute control of at least one of invalidation or renewal of a certificate when the time information of the vehicle passes a validity period of the certificate stored in the storage.

6. The vehicle according to claim 5, wherein the controller is configured to execute control of at least one of invalidation or renewal of a contract when a validity period of the contract stored in the storage passes the time information of the vehicle.

7. The vehicle according to claim 1, wherein the controller is configured to communicate with the server based on a request signal received from the charger to receive the authentication information.

8. A method for controlling a vehicle, comprising:
receiving, by a controller, authentication information from a server;
electrically connecting to a charger, and receiving time information of the charger from the charger;
deriving, by the controller, time information of the vehicle based on the time information of the charger and reference time information included in the authentication information; and
adjusting, by the controller, the time of at least one processor disposed within the vehicle to be synchronized.

9. The method according to claim 8, wherein the deriving of time information of the vehicle includes:
adjusting, by the controller, the time information of the charger based on the reference time information and using the time information of the changed charger as the time information of the vehicle.

10. The method according to claim 8, wherein the deriving of time information of the vehicle includes:
adjusting, by the controller, the time information of the charger when the difference between the reference time information and the time information of the charger is less than a predetermined time and using the time information of the changed charger as the time information of the vehicle.

11. The method according to claim 8, further comprising:
releasing, by the controller, the connection with the charger when the difference between the reference time information and the time information of the charger exceeds a predetermined time.

12. The method according to claim 8, further comprising:
executing, by the controller, control of at least one of invalidation or renewal of a certificate when the time information of the vehicle passes a validity period of the certificate stored in a storage.

13. The method according to claim 12, further comprising:
executing, by the controller, control of at least one of invalidation or renewal of a contract when a validity period of the contract stored in the storage passes the time information of the vehicle.

14. The method according to claim 8, wherein the deriving of time information of the vehicle includes:
communicating, by the controller, with the server based on a request signal received from the charger to receive the authentication information.

* * * * *